United States Patent
Mccarthy et al.

(10) Patent No.: US 10,513,614 B2
(45) Date of Patent: Dec. 24, 2019

(54) BLENDS OF MICROCRYSTALLINE AND MACROCRYSTALLINE TALC FOR REINFORCING POLYMERS

(71) Applicant: Imerys Talc America, Inc., Roswell, GA (US)

(72) Inventors: Edward F. Mccarthy, Morgan Hill, CA (US); Saied Kochesfahani, San Jose, CA (US); Michele Laperna Wong, Redwood City, CA (US)

(73) Assignee: Imerys Talc America, Inc., Roswell, GA (US)

( * ) Notice: Subject to any disclaimer, the term of this patent is extended or adjusted under 35 U.S.C. 154(b) by 0 days.

(21) Appl. No.: 15/324,195

(22) PCT Filed: Jul. 2, 2015

(86) PCT No.: PCT/US2015/038936
§ 371 (c)(1),
(2) Date: Jan. 5, 2017

(87) PCT Pub. No.: WO2016/007363
PCT Pub. Date: Jan. 14, 2016

(65) Prior Publication Data
US 2017/0198146 A1 Jul. 13, 2017

Related U.S. Application Data

(60) Provisional application No. 62/022,537, filed on Jul. 9, 2014.

(51) Int. Cl.
| | |
|---|---|
| C09C 1/28 | (2006.01) |
| C09C 1/02 | (2006.01) |
| C01B 33/22 | (2006.01) |
| C08K 3/34 | (2006.01) |
| C08L 23/12 | (2006.01) |
| C08L 23/14 | (2006.01) |
| C08L 23/08 | (2006.01) |
| C08L 71/02 | (2006.01) |
| C09C 1/42 | (2006.01) |

(52) U.S. Cl.
CPC ............... *C09C 1/28* (2013.01); *C01B 33/22* (2013.01); *C08K 3/346* (2013.01); *C08L 23/0815* (2013.01); *C08L 23/12* (2013.01); *C08L 23/14* (2013.01); *C08L 71/02* (2013.01); *C09C 1/02* (2013.01); *C09C 1/42* (2013.01); *C01P 2004/61* (2013.01); *C01P 2004/62* (2013.01); *C01P 2006/10* (2013.01); *C01P 2006/62* (2013.01); *C01P 2006/63* (2013.01); *C01P 2006/64* (2013.01); *C08K 2201/005* (2013.01); *C08K 2201/014* (2013.01)

(58) Field of Classification Search
None
See application file for complete search history.

(56) References Cited

U.S. PATENT DOCUMENTS

| | | | | |
|---|---|---|---|---|
| 4,814,019 | A | * | 3/1989 | Weber ................... C04B 14/042 |
| | | | | 106/469 |
| 6,132,744 | A | | 10/2000 | Chehab et al. |
| 2001/0008915 | A1 | | 7/2001 | Hirata et al. |
| 2003/0205344 | A1 | | 11/2003 | Lasmarias et al. |
| 2004/0087682 | A1 | | 5/2004 | Drummond |
| 2015/0376414 | A1 | * | 12/2015 | Jouffret ................... C09C 1/28 |
| | | | | 523/213 |
| 2017/0014316 | A1 | * | 1/2017 | D'Ambrogio ........... A61K 8/25 |

FOREIGN PATENT DOCUMENTS

| | | | |
|---|---|---|---|
| WO | WO 02/085972 A1 | 10/2002 | |
| WO | WO 2009/045351 A1 | 4/2009 | |
| WO | WO 2010/055191 A1 | 5/2010 | |
| WO | WO 2012/010481 A1 | 1/2012 | |
| WO | WO 2012/010482 A1 | 1/2012 | |
| WO | WO-2012010481 A1 * | 1/2012 | ............. C08L 23/12 |
| WO | WO 2014/096203 A1 | 6/2014 | |

OTHER PUBLICATIONS

Castillo et al. "Influence of talc morphology on the mechanical properties of talc filled polypropylene", J. Polym. Res. 2013, 20:152, 9 pages (Year: 2013).*

International Search Report and Written Opinion dated Sep. 30, 2015, in International Application No. PCT/US2015/038936 (12 pgs.).

Holland, HJ et al. "An XRD Morphology Index for Talcs: The Effect of Particle Size and Morphology on the Specified Surface Area", Advances in X-ray Analysis, vol. 42, 2000, pp. 421-428; abstract; table 1.

Extended European Search Report in EP 15818604, dated Jan. 18, 2018.

(Continued)

*Primary Examiner* — Nicole M. Buie-Hatcher
(74) *Attorney, Agent, or Firm* — Finnegan, Henderson, Farabow, Garrett & Dunner

(57) ABSTRACT

A composition may include a first talc having a morphology index less than or equal to about 0.6 and a second talc having a morphology index greater than or equal to about 0.6. The first talc and the second talc may form a talc composition, and the talc composition may have a content ratio of the first talc to the second talc ranging from about 30:70 by weight to about 80:20 by weight. A polymer composition may include a polymer matrix and a filler composition. The filler composition may include a first talc having a morphology index less than or equal to about 0.8 and a second talc having a morphology index greater than or equal to about 0.8. The filler composition may have a content ratio of the first talc to the second talc ranging from about 30:70 by weight to about 80:20 by weight. The first talc may be a microcrystalline talc. The second talc may be a macrocrystalline talc.

18 Claims, No Drawings

(56) References Cited

OTHER PUBLICATIONS

H.J. Holland & M.J. Murtagh, "An XRD Morphology Index for Talcs: The Effect of Particle Size and Morphology on the Specified Surface Area," Advances in X-Ray Analysis vol. 42, 2000, pp. 421-428.
G. Meli, F. Jouffret, S. Kochesfahani, *Synergism of Mistron Talc with Carbon Black*, KGK rubberpoint, 62, No. 12, 657-660 (Dec. 2009).

* cited by examiner

BLENDS OF MICROCRYSTALLINE AND MACROCRYSTALLINE TALC FOR REINFORCING POLYMERS

CLAIM OF PRIORITY

This application is a U.S. national phase entry under 35 U.S.C. § 371 from PCT International Application No. PCT/US2015/038936, filed Jul. 2, 2015, which claims the benefit of priority of U.S. Provisional Patent Application No. 62/022,537, filed Jul. 9, 2014, the subject matter of which is incorporated herein by reference in its entirety.

FIELD

The present disclosure relates to blends of microcrystalline and macrocrystalline talc for reinforcing polymers.

BACKGROUND

Talc is a hydrated magnesium silicate and is a naturally occurring mineral. Talc may be characterized as being either microcrystalline or macrocrystalline in nature. In particular, talc may generally be in the form of individual platelets. The individual platelet size of the talc (e.g., the median particle diameter as measured by the Sedigraph method) of an individual talc platelet (a few thousand elementary sheets) may vary from approximately 1 micron to over 100 microns, depending on the conditions of formation of the talc deposit. Generally speaking, microcrystalline talc has small crystals, which provide a compact, dense ore. Macrocrystalline talc has large crystals in papery layers. In a microcrystalline structure, talc elementary particles are composed of small plates as compared to macrocrystalline structures, which are composed of larger plates.

Talc may be used as a reinforcing additive for polymer compositions, such as polypropylene; however, microcrystalline talc is generally thought to be less reinforcing for this purpose. Two characteristics of a talc—its particle size distribution and its crude ore source—may affect the properties of talc-filled polypropylene molded articles. For example, talc particle size distribution affects the stiffness (or flexural modulus) and impact strength of a polypropylene molded article. It is shown that both stiffness and impact strength increases as talc particle size decreases. On the other hand, it has also been found that better long-term heat stability is generally realized with increased talc particle sizes.

The geographic source of talc affects the types and amounts of impurities in talc, as well as the crystalline structure. Talcs from certain geographic sources, such as Montana (Yellowstone and Beaverhead talcs, for example) and certain Australian talcs are microcrystalline. Whereas talcs from other locations are macrocrystalline, such as Vermont, Canada, and China talcs. It has historically been believed that microcrystalline talcs are inferior to macrocrystalline talcs as a reinforcing additive for polymers, particularly for polypropylene, and results in poor heat stability and unacceptable discoloration, regardless of the particle size of the talc used.

Microcrystalline talc, however, may be more readily available in certain geographic regions. Therefore, it may be desirable to provide talc compositions for use in stabilizing and strengthening polymers using microcrystalline talc. It may also be desirable to provide filler compositions containing microcrystalline talc that do not result in poor long term heat aging properties and do not result in unacceptable discoloration of the polymer.

The compositions and methods described herein may provide solutions to potential drawbacks with previously-existing compositions and/or methods.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

According to one aspect of this disclosure, a composition may include a first talc having a morphology index less than or equal to about 0.6 and a second talc having a morphology index greater than or equal to about 0.6. The first talc and the second talc may form a talc composition, and the talc composition may have a content ratio of the first talc to the second talc ranging from about 30:70 by weight to about 80:20 by weight. According to another aspect, the first talc may be a microcrystalline talc. According to a further aspect, the second talc may be a macrocrystalline talc.

According to another aspect of this disclosure, a polymer composition may include a polymer matrix and a filler composition. The filler composition may include a first talc having a morphology index less than or equal to about 0.6 and a second talc having a morphology index greater than or equal to about 0.6. The filler composition may have a content ratio of the first talc to the second talc ranging from about 30:70 by weight to about 80:20 by weight. According to another aspect, the first talc may be a microcrystalline talc. According to a further aspect, the second talc may be a macrocrystalline talc.

Exemplary objects and advantages will be set forth in part in the description which follows, or may be learned by practice of the exemplary embodiments.

It is to be understood that both the foregoing general description and the following detailed description are exemplary and explanatory only and are not restrictive of the invention, as claimed.

DESCRIPTION OF EXEMPLARY EMBODIMENTS

Reference will now be made in detail to exemplary embodiments.

Talc is an oleophilic mineral composed of hydrated magnesium silicate generally having the chemical formula $H_2Mg_3(SiO_3)_4$ or $Mg_3Si_4O_{10}(OH)_2$. According to some embodiments, talc may also be chemically described by one or more of the following formulas: $(Si_2O_5)_2Mg_3(OH)_2$, $Si_8Mg_6O_{20}(OH)_4$, or $Mg_{12}Si_{16}O_{40}(OH)_8$. These formulas do not include impurities, which can include inorganics, such as carbonates, other magnesium silicates, ferrous iron compounds; and various organic materials that may be present. Such impurities generally occur in minor amounts, but can occur in larger amounts as well. The impurities found in talcs may vary as to type and amount depending on the geographic source of the talc. There may also be minor elemental substitution of Mg with Fe, Al, or other elements in the crystalline structure of talc.

Talc's organophilic properties make it highly compatible with and easily wet by organic resins. As a result, talc can be used as a filler or functional additive in various polymers.

For example, talc may be used as a filler for thermoplastic resinous compositions, including, but not limited to, compositions containing polyolefins, such as polyethylene, polypropylene, and the like. Talc also possesses a thin-platelet structure when finely ground, which may provide reinforcing properties when used as a filler. As used in this disclosure, the terms "polymer," "resin," and derivations of these terms may be used interchangeably.

Some polymers, such as, for example, polypropylene, may be reinforced with talc, in particular, where the color of the filled, molded resin is a major concern. Talc may also be used as a filler in applications, such as automotive applications, where color may be of less concern, but mechanical properties, such as, for example, stiffness, dimensional stability, and resistance to heat distortion are of primary importance.

The particle size distribution of the talc may affect certain properties of the finished polymer. For example, flexural modulus may vary inversely with talc particle size, whereas long term heat stability may increase with increasing talc particle size.

The crystalline structure of talc (e.g., microcrystalline or macrocrystalline) may be generally described in relation to a "morphology index" ("M" or "MI"), as described in H. J. Holland and M. J. Murtagh, "An XRD Morphology Index for Talcs: The Effect of Particle Size and Morphology on the Specific Surface Area," *Advances in X-ray Analysis*, Vol. 42, pp. 421-428 (2000). For example, talcs having a relatively high MI may be considered "platy" talcs and generally may have a macrocrystalline structure, whereas talcs having a relatively lower MI are less platy and may have a microcrystalline structure. As used herein, the term "microcrystalline" refers to talc composition having an MI less than or equal to about 0.6.

Talcs from certain geographic sources, such as Montana, Yellowstone, and certain Australian talcs, have a microcrystalline structure. Talcs from other geographic locations, such as, for example, Canadian talc may have a macrocrystalline structure. Microcrystalline talc has traditionally been thought to be inferior to macrocrystalline talc as a filler for polymers and resinous materials. It has been surprisingly discovered by the inventors that filler blends of microcrystalline talc and macrocrystalline talc may be used to achieve comparable, and in some cases better, properties than macrocrystalline talc alone.

According to some embodiments of this disclosure, a composition may include a first talc having a morphology index less than or equal to about 0.6 and a second talc having a morphology index greater than or equal to about 0.6. The first talc and the second talc may form a talc composition, and the talc composition may have a content ratio of the first talc to the second talc ranging from about 30:70 by weight to about 80:20 by weight.

According to some embodiments, the first talc may be a microcrystalline talc. According to some embodiments, the second talc may be a macrocrystalline talc.

According to some embodiments, the first talc may have a morphology index less than or equal to about 0.5, such as, for example, less than or equal to about 0.45, less than or equal to about 0.4, less than or equal to about 0.35, or less than or equal to about 0.3.

According to some embodiments, the second talc may have a morphology index greater than or equal to about 0.7, such as, for example, greater than or equal to about 0.75, greater than or equal to about 0.8, greater than or equal to about 0.85, or greater than or equal to about 0.9.

According to some embodiments, the content ratio of the first talc to the second talc may range from about 35:65 by weight to about 75:25 by weight. For example, the content ratio of the first talc to the second talc may range from about 35:65 by weight to about 50:50 by weight, from about 50:50 by weight to about 70:30 by weight, from about 40:60 by weight to about 60:40 by weight, from about 60:40 by weight to about 70:30 by weight, or from about 60:40 by weight to about 75:25 by weight.

According to some embodiments, the talc composition may include a processing aid, such as, a polyether, octyl or nonyl phenol (polyethylene oxide) condensate, soya based-lecithin, or tertiary amines, such as, for example, polyethylene glycol (PEG). According to some embodiments, the amount of processing aid may range from about 0.1 wt % to about 5 wt % relative to the weight of the talc composition, such as, for example, from about 0.1 wt % to about 3 wt %, from about 1 wt % to about 3 wt %, from about 2 wt % to about 4 wt %, from about 3 wt % to about 5 wt %, from about 0.1 wt % to about 1 wt %, from about 0.5 wt % to about 1.5 wt % from about 0.1 wt % to about 0.5 wt %, or about 0.3 wt % relative to the weight of the talc composition.

According to some embodiments, the first talc may include a processing aid, such as a polyether, octyl or nonyl phenol (polyethylene oxide) condensate, soya based-lecithin, or tertiary amines, such as, for example, PEG. According to some embodiments, the second talc may include a processing aid, such as a polyether, octyl or nonyl phenol (polyethylene oxide) condensate, soya based-lecithin, or tertiary amines, such as, for example, PEG.

Particle sizes and other particle size properties referred to in the present disclosure, may be measured using a Sedigraph 5100 instrument as supplied by Micromeritics Corporation. The size of a given particle is expressed in terms of the diameter of a sphere of equivalent diameter, which sediments through the suspension, i.e., an equivalent spherical diameter or esd. The median particle size, or the $d_{50}$ value, is the value determined by the particle esd at which 50% by weight of the particles have an esd less than the $d_{50}$ value.

According to some embodiments, the first talc may have a median particle size ($d_{50}$) less than or equal to about 20 microns, such as, for example, less than or equal to about 15 microns, less than or equal to about 10 microns, less than or equal to about 7 microns, less than or equal to about 6 microns, less than or equal to about 5 microns, less than or equal to about 3 microns, less than or equal to about 2 microns, or less than or equal to about 1 micron. According to some embodiments, the first talc may have a median particle size ranging from about 0.1 micron to about 20 microns, such as, for example, ranging from about 0.5 microns to about 10 microns, ranging from about 0.5 microns to about 5 microns, ranging from about 1 micron to about 5 microns, ranging from about 1 micron to about 3 microns, or ranging from about 1.5 microns to about 2.5 microns.

According to some embodiments, the second talc may have a median particle size ($d_{50}$) less than or equal to about 20 microns, such as, for example, less than or equal to about 15 microns, less than or equal to about 10 microns, less than or equal to about 7 microns, less than or equal to about 6 microns, less than or equal to about 5 microns, less than or equal to about 3 microns, less than or equal to about 2 microns, or less than or equal to about 1 micron. According to some embodiments, the second talc may have a median particle size ranging from about 0.1 micron to about 20 microns, such as, for example, ranging from about 0.5 microns to about 10 microns, ranging from about 0.5 microns to about 5 microns, ranging from about 1 micron to about 5 microns, or ranging from about 1 micron to about 3 microns.

According to some embodiments, the first talc may have a particle size distribution that is substantially similar to the particle size distribution of the second talc. According to some embodiments, the first talc may have a particle size distribution different than the particle size distribution of the second talc. According to some embodiments, the first talc may have a smaller median particle size than the second talc.

According to some embodiments, the first talc, the second talc, or the talc composition may have a bulk density greater than or equal to about 5 lb/ft$^3$. For example, the talc or talc composition may have a bulk density greater than or equal to about 10 lb/ft$^3$, greater than or equal to about 20 lb/ft$^3$, greater than or equal to about 30 lb/ft$^3$, greater than or equal to about 40 lb/ft$^3$, greater than or equal to about 50 lb/ft$^3$, greater than or equal to about 60 lb/ft$^3$, or greater than or equal to about 70 lb/ft$^3$.

According to some embodiments, the first talc and the second talc may be mixed in a wet state to form the talc composition. According to some embodiments, the talc composition may be pelletized. According to some embodiments, the first talc, the second talc, the talc composition, or the pelletized talc may be dried to a moisture content less than or equal to about 5%, such as, for example, less than or equal to about 4%, less than or equal to about 3%, less than or equal to about 2%, less than or equal to about 1%, or less than or equal to about 0.5%.

According to some embodiments, a polymer composition may include a polymer matrix and a filler composition. The filler composition may include a first talc having a morphology index less than or equal to about 0.6 and a second talc having a morphology index greater than or equal to about 0.6. The filler composition may have a content ratio of the first talc to the second talc ranging from about 30:70 by weight to about 80:20 by weight.

According to some embodiments, the first talc may be a microcrystalline talc. According to some embodiments, the second talc may be a macrocrystalline talc.

According to a some embodiments, the polymer matrix may include a thermoplastic polymer. According to some embodiments, the polymer matrix may include a polyolefin polymer. According to some embodiments, the polymer matrix may include polyethylene, polypropylene, polymethylpentene, polybutene-1, ethylene propylene rubber (EPR), ethylene octene elastomer, ethylene butene elastomer, or similar material, or combinations thereof.

According to some embodiments, the first talc may have a morphology index less than or equal to about 0.5, such as, for example, less than or equal to about 0.45, less than or equal to about 0.4, less than or equal to about 0.35, or less than or equal to about 0.3.

According to some embodiments, the second talc may have a morphology index greater than or equal to about 0.7, such as, for example, greater than or equal to about 0.75, greater than or equal to about 0.8, greater than or equal to about 0.85, or greater than or equal to about 0.9.

According to some embodiments, the content ratio of the first talc to the second talc may range from about 35:65 by weight to about 75:25 by weight. For example, the content ratio of the first talc to the second talc may range from about 35:65 by weight to about 50:50 by weight, from about 50:50 by weight to about 70:30 by weight, from about 40:60 by weight to about 60:40 by weight, from about 60:40 by weight to about 70:30 by weight, or from about 60:40 by weight to about 75:25 by weight.

According to some embodiments, the polymer composition may include greater than or equal to about 5 wt % of the filler composition compared to the weight of the polymer matrix. For example, the polymer composition may include greater than or equal to about 10 wt % of the filler composition, greater than or equal to about 15 wt % of the filler composition, greater than or equal to about 20 wt % of the filler composition, greater than or equal to about 25 wt % of the filler composition, greater than or equal to about 30 wt % of the filler composition, greater than or equal to about 35 wt % of the filler composition, greater than or equal to about 40 wt % of the filler composition as compared to the weight of the polymer matrix. According to some embodiments, the polymer composition may include from about 5 wt % to about 40 wt % of the filler composition as compared to the weight of the polymer matrix, such as, for example, from about 10 wt % to about 25 wt % of the filler composition, from about 15 wt % to about 25 wt % of the filler composition, from about 20 wt % to about 30 wt % of the filler composition, from about 25 wt % to about 35 wt % of the filler composition, or from about 30 wt % to about 40 wt % of the filler composition as compared to the weight of the polymer matrix.

According to some embodiments, the filler composition may include a processing aid, such as a polyether, octyl or nonyl phenol (polyethylene oxide) condensate, soya based-lecithin, or tertiary amines, such as, for example, polyethylene glycol (PEG). According to some embodiments, the amount of processing aid may range from about 0.1 wt % to about 5 wt % relative to the weight of the filler composition, such as, for example, from about 0.1 wt % to about 3 wt %, from about 1 wt % to about 3 wt %, from about 2 wt % to about 4 wt %, from about 3 wt % to about 5 wt %, from about 0.1 wt % to about 1 wt %, from about 0.5 wt % to about 1.5 wt % from about 0.1 wt % to about 0.5 wt %, or about 0.3 wt % relative to the weight of the filler composition.

According to some embodiments, the first talc may include a processing aid, such as a polyether, octyl or nonyl phenol (polyethylene oxide) condensate, soya based-lecithin, or tertiary amines, such as, for example, PEG. According to yet a further aspect, the second talc may include a processing aid, such as a polyether, octyl or nonyl phenol (polyethylene oxide) condensate, soya based-lecithin, or tertiary amines, such as, for example, PEG.

According to some embodiments, the first talc may have a median particle size ($d_{50}$) less than or equal to about 20 microns, such as, for example, less than or equal to about 15 microns, less than or equal to about 10 microns, less than or equal to about 7 microns, less than or equal to about 6 microns, less than or equal to about 5 microns, less than or equal to about 3 microns, less than or equal to about 2 microns, or less than or equal to about 1 micron. According to some embodiments, the first talc may have a median particle size ranging from about 0.1 micron to about 20 microns, such as, for example, ranging from about 0.5 microns to about 10 microns, ranging from about 0.5 microns to about 5 microns, ranging from about 1 micron to about 5 microns, ranging from about 1 micron to about 3 microns, or ranging from about 1.5 microns to about 2.5 microns.

According to some embodiments, the second talc may have a median particle size ($d_{50}$) less than or equal to about 20 microns, such as, for example, less than or equal to about 15 microns, less than or equal to about 10 microns, less than or equal to about 7 microns, less than or equal to about 6 microns, less than or equal to about 5 microns, less than or equal to about 3 microns, less than or equal to about 2 microns, or less than or equal to about 1 micron. According to some embodiments, the second talc may have a median particle size ranging from about 0.1 micron to about 20 microns, such as, for example, ranging from about 0.5 microns to about 10 microns, ranging from about 0.5 microns to about 5 microns, ranging from about 1 micron to about 5 microns, or ranging from about 1 micron to about 3 microns.

According to some embodiments, the first talc may have a particle size distribution that is substantially similar to the particle size distribution of the second talc. According to some embodiments, the first talc may have a particle size distribution different than the particle size distribution of the second talc. According to some embodiments, the first talc may have a smaller median particle size than the second talc.

According to some embodiments, the first talc, the second talc, or the talc composition may have a bulk density greater than or equal to about 5 lb/ft$^3$. For example, the talc or talc composition may have a bulk density greater than or equal to about 10 lb/ft$^3$, greater than or equal to about 20 lb/ft$^3$, greater than or equal to about 30 lb/ft$^3$, greater than or equal to about 40 lb/ft$^3$, greater than or equal to about 50 lb/ft$^3$, greater than or equal to about 60 lb/ft$^3$, or greater than or equal to about 70 lb/ft$^3$.

According to some embodiments, the first talc and the second talc may be mixed in a wet state to form the talc composition. According to some embodiments, the talc composition may be pelletized. According to some embodiments, the first talc, the second talc, the talc composition, or the pelletized talc may be dried to a moisture content less than or equal to about 5%, such as, for example, less than or equal to about 4%, less than or equal to about 3%, less than or equal to about 2%, less than or equal to about 1% or less than or equal to about 0.5%

According to some embodiments, blends of microcrystalline and macrocrystalline talc may be used to reinforce a polymer. According to some embodiments, the polymer may include a thermoplastic polymer. According to some embodiments, the polymer may include a polyolefin polymer, such as, for example, polyethylene, polypropylene, polymethylpentene, polybutene-1, ethylene propylene rubber (EPR), ethylene octene elastomer, ethylene butene elastomer, or similar material and combinations thereof. According to some embodiments, the polymer may be a homopolymer. According to some embodiments, the polymer may include a copolymer, such as, for example, an alternating copolymer, a block copolymer, a statistical copolymer, or a periodic copolymer. According to some embodiments, at least one polymer in the copolymer may be a polyolefin.

Although certain embodiments may be discussed in terms of polypropylene or polypropylene homopolymers, it is understood that these embodiments are not limiting of the disclosure, but are discussed to facilitate understanding and explanation of certain exemplary embodiments.

Example 1

Two samples, A and B, were prepared by compounding 20 wt % of talc in a resin blend that contains 80% of a 75 MFR copolymer propylene (commercially available as 5946WZ polypropylene from Total Refining and Chemicals) and 20% ethylene-octene elastomer (commercially available as Engage 8150 from Dow Chemical). The compounds were produced in a Leistritz LSM 30.34 twin-screw extruder.

Sample A was prepared by adding 20 wt % of a macrocrystalline talc filler to the resin blend described above. The macrocrystalline talc filler composition included a macrocrystalline talc with a median particle size of 2.0 microns ("Talc 1").

Sample B was prepare by adding 20 wt % of a blended microcrystalline and macrocrystalline talc filler composition to the resin blend described above. The blended filler composition included 70% by weight microcrystalline Montana talc with a median particle size of 1.9 microns ("Talc 2") and 30% by weight macrocrystalline talc ("Talc 3") with a median particle size of 1.7 microns.

Sample C was prepare by adding 20 wt % of a microcrystalline talc filler to the resin blend described above. The microcrystalline talc filler composition included the same microcrystalline Montana talc as sample B ("Talc 2").

After compounding of the respective talc fillers in the thermoplastic olefin formulation described, the compounded pellets were dried and then injection molded using a ISO standard mold to produce standard specimens for measuring mechanical properties, including, flexural modulus, notched Izod impact strength (at room temperature), and Falling-Tup Impact (FTI) strength at −30° C.

Stiffness was measured on specimens that were conditioned at room temperature for 7 days based on ISO 178 Standard procedure using an Instron 3037 multi tester.

Falling-Tup Impact strength was measured based on the ASTM D5628 standard procedure using a Dynatup 8210 instrumented biaxial drop-weight impact tester. The sample test specimens were conditioned at room temperature for 7 days, followed by a second conditioning for one hour at −30° C. prior to testing.

Izod impact strength was measured on samples that were conditioned at room temperature for 7 days based on ISO 180 standard procedure using a Tenius Olsen pendulum impact tester.

TABLE 1

Mechanical Properties of Blended Talc Filler as Compared to Macrocrystalline Talc Filler

| | | Products | | |
|---|---|---|---|---|
| Properties | | Sample A (100% Talc 1) | Sample B (70% Talc 2- 30% Talc 3) | Sample C (100% Talc 2) |
| Young's (tangential) Modulus (MPa) | Average Standard Deviation | 1480 MPa 15 | 1438 MPa 21 | 1322 MPa 11 |
| 1% Secant Flexural Modulus, (MPa) | Average Standard Deviation | 1231 MPa 11 | 1224 MPa 16 | 1155 MPa 8 |
| IZOD Impact Strength (kJ/m$^2$) | Average Standard Deviation | 47.3 kJ/m$^2$ 2.4 | 38.4 kJ/m$^2$ 2.9 | 34.4 kJ/m$^2$ 3.4 |
| IZOD Impact Resistance (J/m) | Average Standard Deviation | 391 J/m 20 | 313 J/m 24 | 283 J/m 28 |
| FTI at −30° C., Total Energy (J) | Average Standard Deviation | 16.8 J 1.3 | 18.7 J 0.5 | 18.1 J 1.1 |
| Ductility Index, % | Calculated | 38% | 44% | 42% |
| Ductility Rating: 0 = brittle; 1 = brittle/ductile; 2 = ductile | Average | 1.2 | 1.9 | 1.0 |

As shown in Table 1, sample B (blended talc filler) had mechanical properties similar to sample A (macrocrystalline talc filler). Sample B also had better mechanical properties than sample C (microcrystalline talc filler) for Young's modulus and 1% secant flexural modulus. As also shown in Table 1, the Young's modulus and 1% secant flexural modulus (both of which may represent stiffness or rigidity) of sample B were similar to or only slightly lower (for Young's modulus) than sample A, but may be considered comparable for many applications. The Young's modulus and 1% secant flexural modulus of sample B were greater than sample C by more than 110 MPa and almost 70 MPa, respectively. Samples B and C also showed better FTI performance than sample A, with the FTI of sample B being slightly higher than sample C. Surprisingly, however, the ductility of sample B was clearly higher than the ductilities of each of samples A and C. The increased ductility resulting from the blended talc filler composition may create a more malleable finished polymer product. The increased ductility may also allow a polymer containing a blended talc filler to deform under applied stress rather than cracking or rupturing.

Example 2

Three samples, A*, C*, D, and E, were prepared for heat aging and color testing. Sample A* used the same macrocrystalline talc ("Talc 1") that was used to prepare sample A in Example 1. Sample C* used the same microcrystalline talc ("Talc 2") as used to prepare sample C in Example 1. Samples D and E used the same blended talc filler as sample B of Example 1, except that the blended talc filler of sample D included 65% by weight microcrystalline Montana talc ("Talc 2") and 35% by weight macrocrystalline talc ("Talc 3"). Sample E was similar to sample D, except that the blended talc filler also included 0.3% by weight polyethylene glycol relative to the total weight of the blended talc filler.

Samples A*, C*, D, and E were made by compounding 20% of each talc in Braskem's homopolymer polypropylene F180A using a 16 mm Thermo Electron twin screw extruder. A sheet die was used to prepare extruded ribbons that were about 0.65 mm thick. Small cuts of ribbon samples were placed at heat aging oven at 150° C. to conduct the heat aging tests based on ISO 4577 Standard procedure. Stacks of 4 ribbons were tested for measuring the compounded color of samples. The results of the heat aging and color tests are shown in Table 2 below.

TABLE 2

Color Properties of Blended Talc Filler as Compared to Macrocrystalline Talc Filler

| Sample | | Compounded Color in Plastic | | | Long Term Heat Aging (LTHA) at 150° C. (hrs) |
| --- | --- | --- | --- | --- | --- |
| | | CIE L* | CIE a* | CIE b* | |
| Sample A* (Talc 1) | Average | 64.7 | 0.9 | 5.2 | 46-52.5 |
| | Standard Deviation | 0.5 | 0.0 | 0.1 | — |
| Sample C* (Talc 2) | Average | 65.8 | −0.1 | 8.3 | 8-22 |
| | Standard Deviation | 0.3 | 0.1 | 0.4 | — |
| Sample D (65% Talc 2- 35% Talc 3) | Average | 67.0 | −0.02 | 6.5 | 8-22 |
| | Standard Deviation | 0.2 | 0.0 | 0.5 | — |
| Sample E (65% Talc 2- 35% Talc 3 (with 0.3% PEG)) | Average | 70.9 | −0.8 | 6.7 | 110-118 |
| | Standard Deviation | 0.3 | 0.1 | 0.8 | — |

As shown in Table 2, the heat aging properties of samples C* (microcrystalline talc) and D (blended talc without PEG) were significantly less than sample A* (macrocrystalline filler). However, the heat aging properties of sample E (blended talc with PEG) were more than double that of sample A* (macrocrystalline filler). These results show that aging resistance can be improved through the use of a blended talc filler compositions and a polyether (e.g., PEG).

As also shown in Table 2, the whiteness (L*) of each of samples D and E was greater than each of samples A* and C*. Samples D and E also had a lower a* value (e.g., less red) than sample A*, but samples D and E had higher yellowness (b*) values than sample A*. However, Samples D and E had a lower yellowness than sample C*.

As shown in Examples 1 and 2, microcrystalline talc may be blended with macrocrystalline talc and used as a filler for a polymer, such as polypropylene. The mechanical, thermal, and/or color properties of a polymer containing the blended filler may be comparable to, or even better than, polymers containing only macrocrystalline talc filler. For example, a polymer containing a blended talc filler may have comparable Young's modulus characteristics and impact resistance, but improved ductility as compared to a polymer having a macrocrystalline-only talc filler. According to some embodiments, the properties of a polymer containing a blended talc filler may be further improved by the addition of PEG to the filler, which may, for example, increase the heat aging, reduce the ash content (e.g., loading), and further improve the whiteness of the resulting polymer. The use of a blended talc sample may include significant portions of microcrystalline talc, which was previously thought to be unsuitable as a reinforcing filler for polymers.

Furthermore, as shown in Examples 1 and 2, and contrary to conventional teachings, microcrystalline talc may be used as a reinforcing filler material for polymers while still retaining desirable mechanical, thermal, and/or color properties, comparable to those achieved by a macrocrystalline talc. The percentage of the microcrystalline talc may be relatively high, for example, from about 30% to about 80% by weight of the filler composition. Therefore, blended talc filler compositions containing relatively high weight percentages of microcrystalline talc may be used as a replacement for fillers containing only macrocrystalline talc without significant adverse effects on the mechanical, thermal, and/or color properties of the finished polymer. The use of a blended talc filler may also reduce the cost of the filler composition, thereby reducing the cost of the finished polymer by allowing replacement of macrocrystalline talc with microcrystalline talc in relatively large percentages. These examples show that polymers having blended talc filler compositions may have a more desirable balance of desirable mechanical, thermal, and/or color properties than polymers having only microcrystalline or macrocrystalline talc fillers.

Other embodiments will be apparent to those skilled in the art from consideration of the specification and practice of the exemplary embodiments disclosed herein. It is intended that the specification and examples be considered as exemplary only, with a true scope and spirit of the invention being indicated by the following claims.

What is claimed is:

1. A composition comprising:
    a first talc having a morphology index less than or equal to 0.6; and
    a second talc having a morphology index greater than or equal to 0.7,
    wherein the first talc and the second talc form a talc composition, and
    wherein the talc composition has a content ratio of the first talc to the second talc ranging from about 30:70 by weight to about 80:20 by weight.

2. The composition of claim 1, wherein the first talc has a morphology index less than or equal to 0.5.

3. The composition of claim 1, wherein the content ratio of the first talc to the second talc ranges from about 35:65 by weight to about 70:30 by weight.

4. The composition of claim 1, wherein the talc composition further comprises a polyether.

5. The composition of claim 4, wherein the polyether is polyethylene glycol.

6. The composition of claim 4, wherein the amount of polyether ranges from about 0.1 wt % to about 0.5 wt % relative to the amount of the talc composition.

7. The composition of claim 1, wherein the first talc has a median particle size less than or equal to about 5 microns.

8. The composition of claim 1, wherein the first talc has a median particle size less than or equal to about 2 microns.

9. The composition of claim 1, wherein the second talc has a median particle size less than or equal to about 10 microns.

10. The composition of claim 1, wherein the second talc has a median particle size less than or equal to about 5 microns.

11. The composition of claim 1, wherein the second talc has a median particle size less than or equal to about 3 microns.

12. A polymer composition comprising:
    a polymer matrix; and
    a filler composition, the filler composition comprising
        a first talc having a morphology index less than or equal to 0.6; and
        a second talc having a morphology index greater than or equal to 0.7, and
    wherein the filler composition has a content ratio of the first talc to the second talc ranging from about 30:70 by weight to about 80:20 by weight.

13. The polymer composition of claim 12, wherein the polymer matrix comprises a thermoplastic polymer.

14. The polymer composition of claim 12, wherein the polymer matrix comprises a polyolefin polymer.

15. The polymer composition of claim 12, wherein the polymer matrix is selected from the group consisting of polyethylene, polypropylene, polymethylpentene, polybutene-1, ethylene propylene rubber (EPR), ethylene octene elastomer, ethylene butene elastomer, and combinations thereof.

16. The polymer composition of claim 12, wherein the filler composition further comprises a polyether.

17. The polymer composition of claim 16, wherein the polyether is polyethylene glycol.

18. The polymer composition of claim 16, wherein the amount of polyether ranges from about 0.1 wt % to about 5 wt % relative to the amount of the talc composition.

* * * * *